United States Patent [19]

Iorizzo

[11] Patent Number: 5,236,164
[45] Date of Patent: Aug. 17, 1993

[54] SUSPENSION DEVICE FOR USE ON FABRIC STRUCTURES

[76] Inventor: Davide Iorizzo, 2725 Pandora Street, Vancouver, British Columbia, Canada, V5K 1W2

[21] Appl. No.: 725,540

[22] Filed: Jul. 3, 1991

[51] Int. Cl.⁵ ............................................. F16M 13/00
[52] U.S. Cl. ..................................... 248/343; 248/345
[58] Field of Search ............................... 248/342–345, 248/56

[56] References Cited

U.S. PATENT DOCUMENTS

| | | | |
|---|---|---|---|
| 1,901,235 | 3/1933 | Clowacki | 248/343 X |
| 1,921,162 | 8/1933 | Kennedy | 248/345 X |
| 2,820,888 | 1/1958 | Felcete | 248/343 X |
| 2,943,137 | 6/1960 | Van Wyngarden | 248/343 X |
| 2,967,929 | 1/1961 | Wolar | 248/345 X |
| 2,987,283 | 6/1961 | Bleckmann | 248/56 |
| 3,619,957 | 11/1971 | Adam . | |
| 3,710,519 | 1/1973 | Jones . | |
| 3,869,118 | 3/1975 | Kranz . | |
| 4,078,795 | 3/1978 | Porter . | |
| 4,153,246 | 5/1979 | Byrne . | |

OTHER PUBLICATIONS

DAFT Electrical Supplies & Services, Inc. advertisement.

*Primary Examiner*—Alvin C. Chin-Shue
*Attorney, Agent, or Firm*—Ladas & Parry

[57] ABSTRACT

The invention provides a device for use in association with fabric structures. The device comprises a member for sealing engagement with the fabric structure. The member has an inner rigid portion and an outer flexible portion, contiguous to said inner rigid portion. The flange may be affixed to the fabric of the structure, so as not to shift relative to the fabric, by bonding the outer flexible portion of the flange to the fabric of the structure. Mountable to the inner rigid portion is means for supporting a suspended object. The means for supporting a suspended object is adapted to be sealed, that is, it may be made water-tight. The means for supporting a suspended object comprises support means mountable to the top side of the inner rigid portion of the member, support means mountable to the bottom side of the inner rigid portion of said member, and securing means adapted to extend through the member so as to couple the support means on one side of the member to the support means on the other side of the member.

20 Claims, 4 Drawing Sheets

SUSPENSION DEVICE FOR USE ON FABRIC STRUCTURES

FIELD OF THE INVENTION

The present invention relates to a device for suspending curtains, nets, lights, scoreboards or the like inside fabric structures such as inflatable fabric bubbles.

BACKGROUND OF THE INVENTION

Fabric structures are commonly used to enclose sports facilities such as tennis courts. These structures allow year round use of the sports facility.

In the prior art, when it was desired to partition off areas within the fabric structure, it was necessary to erect posts from which to hang dividing curtains or nets. Similarly, when lighting or scoreboards were required, the lights or scoreboards also had to be mounted on posts. However, these posts proved to be inconvenient and potentially hazardous in that they hindered the free movement of the athletes using the facility. Further, in the case of inflated structures, if the structure deflated the posts could puncture the fabric.

Attempts have been made to suspend curtains, nets, lights or the like directly from the fabric in fabric structures, and specifically from the fabric in inflated structures.

With specific reference to ceiling suspension devices used in inflated structures, one system uses a rigid disc, which is typically made of either plywood or metal, as a bearing plate on the outside of the structure from which to suspend the curtains, nets, lights or the like. A length of rope having a large nut or similar obstructing item at one end, is fed through a hole in the disc and through a corresponding hole cut into the fabric of the inflated structure.

In one variant of this system the disc is covered with a vinyl or other fabric covering and merely placed over the hole in the fabric of the inflated structure. Such a system is employed by DAFT TM Electrical Supplies and Services, Inc. of Mamaroneck, N.Y. in their HANG LITE TM suspended lighting system.

In another variant of this system, once the rope is fed through both the hole in the disc and the hole in the inflated structure, so that the disc lays flush against the outer surface of the structure, a fabric patch is applied over the disc and sealed to the fabric of the structure. The seal and patch prevent water incursion from the outside of the structure. The large nut or similar obstructing item prevents the rope from pulling through the hole in the disc. The disc thus acts as a bearing plate to support the rope and to distribute the load when a force, such as from suspending lights, is applied to the rope.

This system has a distinct disadvantage. Because the rigid disc is free to move (in the second variant movement is within the confines of the fabric patch), and because the inflated fabric structure sways in the wind, relative abrasive movement occurs between the rope and the edges of the hole cut in the fabric of the structure. This relative abrasive movement results in the rope sawing into the fabric of the structure. Consequently, the fabric structure must be occasionally repaired.

The second variant has a distinct disadvantage in that the fabric patch inflates due to the pressurized air within the inflated structure leaking through the hole in the disc and structure. This gives the fabric patch the appearance of a blister. Also, the air within the blister is often moist so that when the air in the blister cools, condensation is formed within the blister. Water condensing in the blister trickles down the rope and forms a puddle on the ground beneath. Such puddles are not only a nuisance, but also a potential hazard if the structure is being used to cover a sports facility. Further, when the structure is deflated for storage, the blister must be cut open to remove the disc. Consequently, a new patch must be installed when the structure is re-inflated.

A second system has been tried in an attempt to eliminate the use of the fabric patch. Two rigid discs are employed, one on either side of the fabric of the inflated structure. Silicone caulking is sandwiched between the two discs in the vicinity of a hole which is cut in the fabric of the inflated structure. A threaded eye bolt is inserted through the hole and through corresponding holes in the discs. A nut is threaded onto the eye bolt to compress the two discs, with the silicone caulking and fabric between. The head of the eye bolt extends into the interior of the inflated structure, and is used to suspend the ropes which secure the curtains, nets, lights or the like.

The fabric of an inflated structure is typically coated fabric made of reinforced vinyl sold under the trademark SHELTER RITE TM. It has been found that silicone caulking will not properly adhere to SHELTER RITE TM fabric or to discs made of wood or metal. Consequently, silicone caulking does not form an effective water-tight seal between discs used to sandwich the caulking, and water leaks into the interior of the inflated structure. Further, due to the swaying motion of the inflated structure, it has been found that the discs shift relative to the structure, bringing the threaded portion of the eye bolt into abrasive contact with the fabric of the structure. Again, this results in tearing of the fabric. Often, this system works so poorly that a fabric patch, also made of SHELTER RITE TM, is resorted to, resulting in the disadvantages of the first system described above. SHELTER RITE TM is used as the patch fabric because the patch may be simply welded onto the fabric structure using a hot-air gun and a roller, a technique well known in the art.

Both of the above-described types of suspension devices have to be removed from the fabric structure when the structure is deflated and stored, typically during the summer months. This requires cutting apart any fabric patches so as to remove the discs. New patches must be installed when re-inflating the structure.

SUMMARY OF THE INVENTION

The invention provides a device for use in association with fabric structures. The device comprises a member for sealing engagement with the fabric structure. The member has an inner rigid portion and an outer flexible portion, contiguous to said inner rigid portion. The flange may be affixed to the fabric of the structure, so as not to shift relative to the fabric, by bonding the outer flexible portion of the flange to the fabric of the structure. Mountable to the inner rigid portion is means for supporting a suspended object. The means for supporting a suspended object is adapted to be sealed, that is, it may be made water-tight. The means for supporting a suspended object comprises support means mountable to the top side of the inner rigid portion of the member, support means mountable to the bottom side of the inner rigid portion of the member, and securing means adapted to extend through the member so as to couple the support means on one side of said member to the support means on the other side of the member.

Preferably, the member for sealing engagement with the fabric structure is constructed of a rigid disc, corresponding in area to the inner rigid portion, sandwiched between two layers of fabric. The layers of fabric extend beyond the periphery of the disc and are bonded together to form the outer flexible portion. The disc and layers of fabric have an aperture therethrough.

Preferably, the means for supporting a suspended object comprises an upper collar having a threaded recess therein and a collar extension extending therefrom. The collar extension extends through an aperture in the inner rigid portion of the member and, when installed, extends through a corresponding aperture in the fabric of the fabric structure. A washer means is adapted to be releasably secured onto the collar extension and a cap is provided for water-tight mounting in the recess. The collar extension has a bore wherethrough a rope or like suspension means may be passed. A knot in the rope, or other obstruction affixed to the rope, may be seated in the recess.

In order to make the device water-tight when mounted on the fabric structure, the flexible outer portion of the member is heat welded by conventional means to the fabric of the fabric structure. The aperture in the member, that is, the aperture in the rigid disc and layers of fabric, is sealed by means of resilient gaskets mounted on either side of the aperture and compressed between the collar and the washer means onto the surfaces surrounding the aperture on either side of the member. A resilient gasket is also provided between the top surface of the collar and the cap so that the resilient gasket is compressed when the cap is mounted in the recess. In one embodiment, the cap is adapted to be threaded into corresponding threading in the recess. Similarly, in one embodiment the washer means is adapted to be threaded onto corresponding threads on the collar extension and the gaskets are adapted to be journalled onto the collar extension, one either side of the member. The collar and washer means have faces adapted to impinge the inner rigid portion of the member by compressing the resilient gaskets.

The bore in the collar extension and the recess in the collar are aligned so that a rope or like suspension means may penetrate through the bore and into the recess so that once the rope is knotted, or like obstruction affixed to the end of the rope within the recess, the rope is engaged within the recess so that the rope may be used to suspend an object from the member and means for supporting a suspended object mounted on the fabric structure.

Where the suspended object sought to be suspended is a scoreboard, a light fixture, or the like, that is, where the object must be electrically wired, a further embodiment of the device is employed which incorporates a port in the cap. Thus, electrical wiring may penetrate the bore and recess and pass through the port in the cap so that the wiring harness is thereby passed to the outside of the fabric structure. The port is adapted to be watertight about the electrical wiring. In this embodiment, a supporting structure may be releasably engaged to the collar extension when the collar is mounted onto the member. The supporting structure engages the portion of the collar extension which extends beyond the washer means. The supporting structure is used to suspend suspended objects such as scoreboards or lights, and may be rigid and adapted to threadably engage a threaded portion of the collar extension extending beyond the washer means. The supporting structure is adapted to allow the electrical wiring to pass into the bore in the collar extension.

The present invention also provides a method for installing a device for use in association with fabric structures which comprises the steps of: (1) cutting a hole in the fabric structure; (2) sealing a member over the hole so that the hole is aligned with an aperture in the flange; (3) mounting means for supporting a suspended object in the aperture and the hole so that the portion of the means for supporting a suspended object which is adapted for passing a rope therethrough is inserted into the hole and the aperture; (4) sealing the means for supporting a rope onto the flange so as to prevent water incursion through the aperture in the flange; (5) threading a rope through a bore in the means for supporting a suspended object, the hole, and the aperture so that an end of the rope is secured within the means for supporting a suspended object and the other end of the rope extends beneath the fabric structure; and, (6) sealing the means for supporting a suspended object so as to prevent water incursion into the bore in the means for supporting a suspended object.

In an alternate embodiment of this method the means for supporting a suspended object is mounted onto the member before the member is mounted onto the fabric of the fabric structure.

BRIEF DESCRIPTION OF THE DRAWINGS

In drawings which illustrate specific embodiments of the invention, but which should not be construed as restricting the scope of the invention in any way.

DETAILED DESCRIPTION OF SPECIFIC EMBODIMENTS OF THE INVENTION

Figure 1:
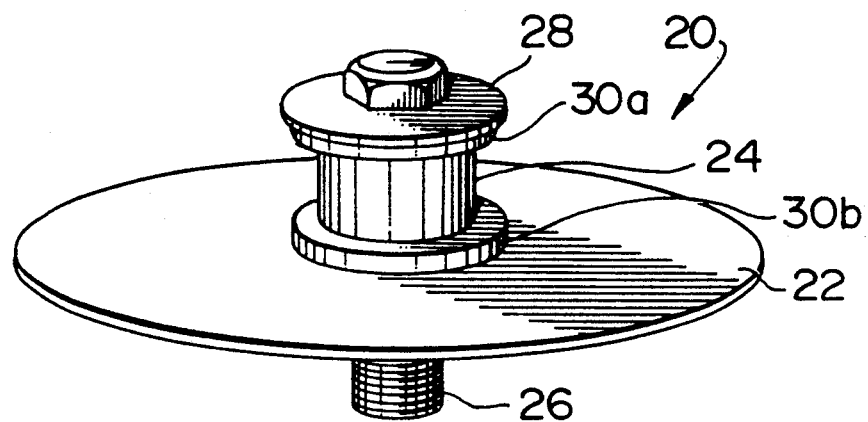
FIG. 1 is a top perspective view of the suspension device of the present invention.

As illustrated in FIG. 1, suspension device 20 comprises a disc 22 having a covering of SHELTER RITE ™ fabric and a collar 24 mounted thereon. Threaded shaft 26 extends from collar 24 through an aperture (seen best in FIG. 4) in disc 22. Watertight cap 28 is mounted on collar 24. Gaskets 30a and 30b make watertight seals between cap 28, and collar 24, and between collar 24 and disc 22 respectively.

Figure 2:
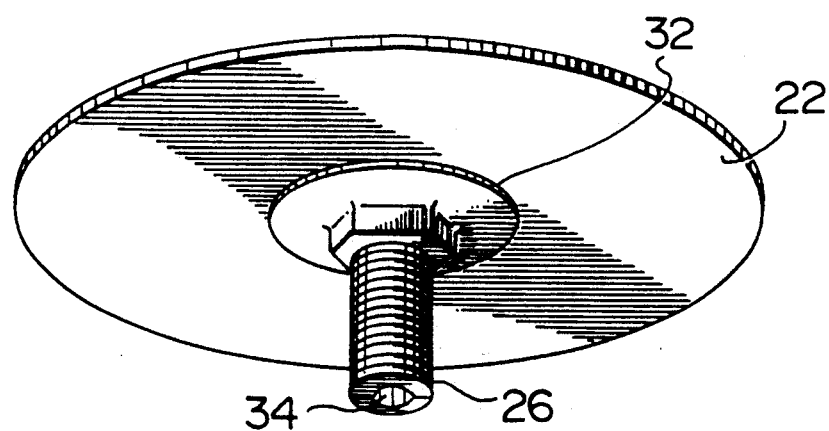
FIG. 2 is a bottom perspective view of the invention illustrated in FIG. 1.

As illustrated in FIG. 2, threaded washer 32 is threaded onto shaft 26 to compress gasket 30c (shown in FIG. 3) between washer 32 and disc 22. Threading washer 32 onto shaft 26 also compresses gasket 30b between collar 24 and disc 22. Threaded shaft 26 has bore 34 which extends longitudinally along the length of shaft 26.

Figure 3:
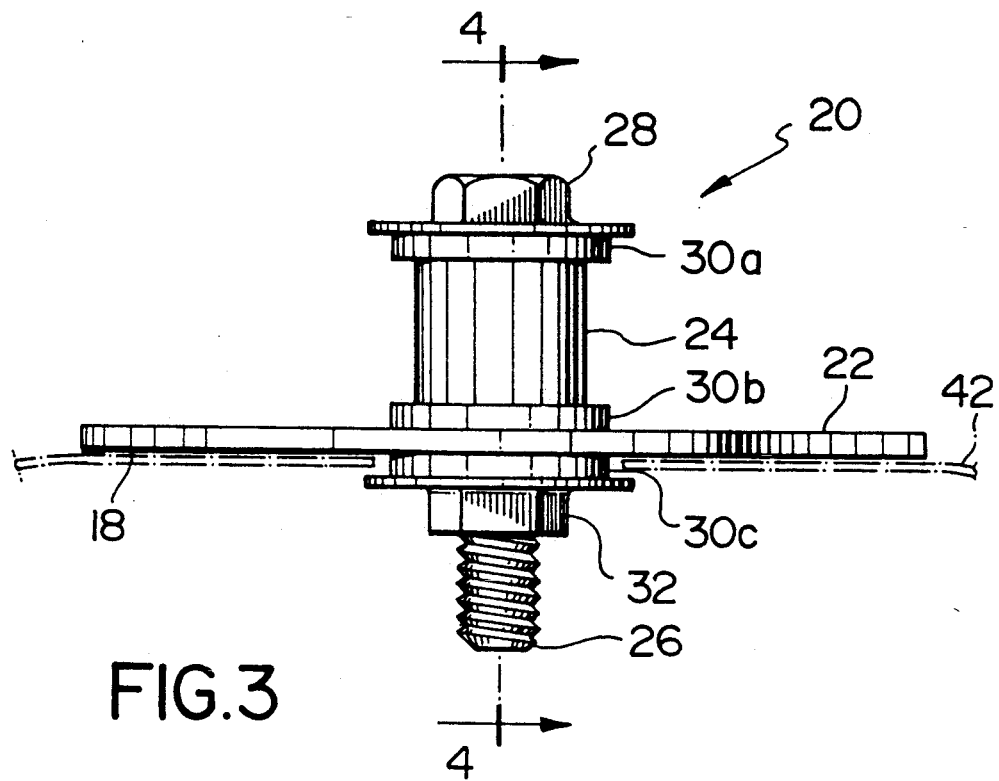
FIG. 3 is a side elevation view of the suspension device of the present invention mounted on a fabric structure.

FIG. 3 illustrates suspension device 20 in side elevation. The device is depicted mounted on fabric structure 42 (shown in cross section in broken outline). The outer portion of the lower surface of disc 22 is bonded directly onto the fabric of fabric structure 42 by weld 18. Weld 18 makes a water-tight seal between the circumference of disc 22 and fabric 42.

Figure 4:
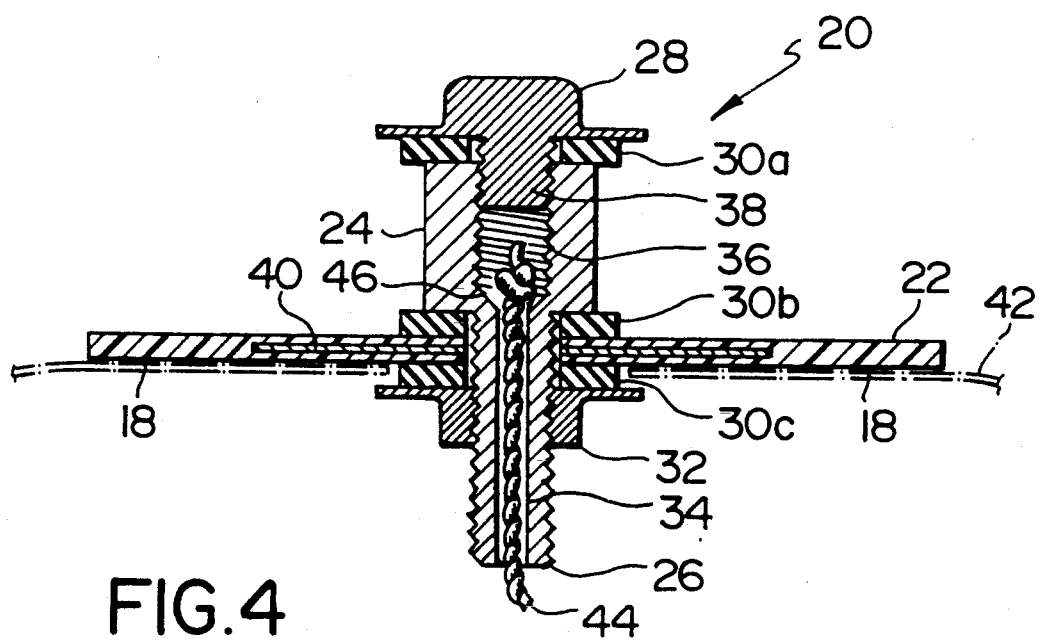
FIG. 4 is a partial cross-sectional view taken along line 4—4 in FIG. 3, illustrating, in addition, a segment of rope supported therein.

FIG. 4 is a cross-section of hanger device 20 along line 4—4 in FIG. 3. A segment of rope 44 is illustrated supported in threaded cavity 36 and bore 34. Bore 34 expands into threaded cavity 36 within collar 24. Watertight cap 28 has threaded extension 38 for threaded engagement with threaded cavity 36. Cap 28 may be tightened down onto gasket 30a to provide a watertight seal around the upper surface of collar 24, thereby sealing threaded cavity 36.

As also illustrated in FIG. 4, rigid disc 40 provides a rigid flange in disc 22. Disc 22 is formed by heat welding together two discs of SHELTER RITE ™ fabric. Rigid disc 40 is sandwiched in between. Disc 22 is thereby formed with an inner rigid flange (defined by rigid disc 40) and an outer flexible flange (defined by the SHELTER RITE covering on disc 22 which extends beyond disc 40). The inner rigid flange provides a bearing surface for gaskets 30b and 30c when washer 32 is tightened onto shaft 26. Gaskets 30b and 30c are compressed against the rigid flange to form a watertight seal around the aperture in disc 22. As illustrated, suspension device 20 may be mounted on fabric structure 42 (shown in cross section in broken outline). The flexible flange portion of disc 22 is heat welded to the outer surface of fabric structure 42 using a method well known in the art so as to form a watertight seal.

Suspension device 20 may support a rope 44 within bore 34 and cavity 36. With cap 28 removed, rope 44 is passed through bore 34. Rope 44 may be knotted or some other obstruction affixed to the end of the rope so that the knot or obstruction resides in cavity 36. When device 20 is mounted on fabric structure 42, rope 44 extends into the interior of fabric structure 42 to support nets, curtains, lights, scoreboards or the like. The weight suspended by rope 44 is taken up by the knot or obstruction resting against bearing surface 46 in cavity 36.

Figure 5:
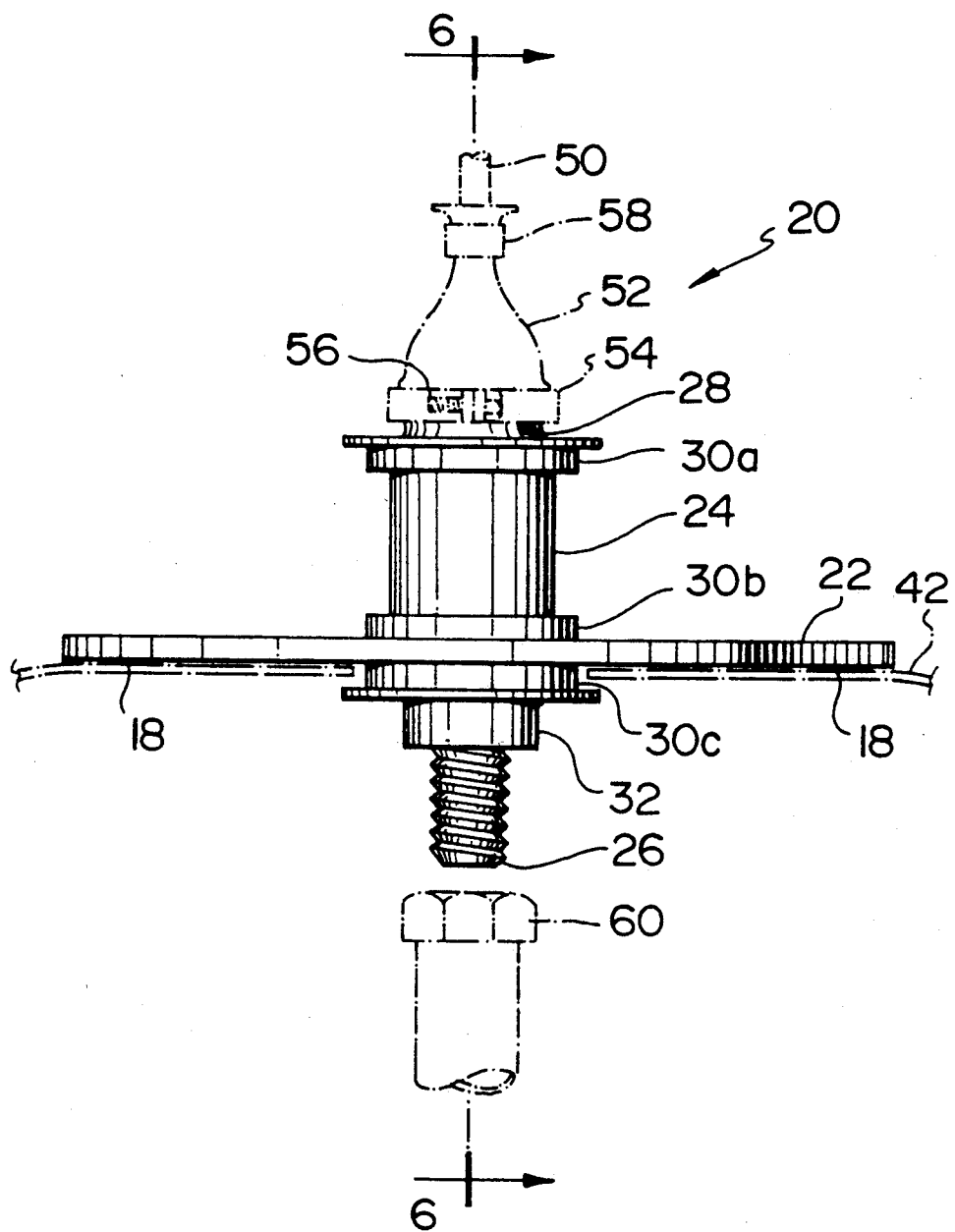
FIG. 5 is a partially exploded side elevation view of an alternate embodiment of the suspension device of the suspension device of the present invention mounted on a segment of fabric structure.
Figure 6:
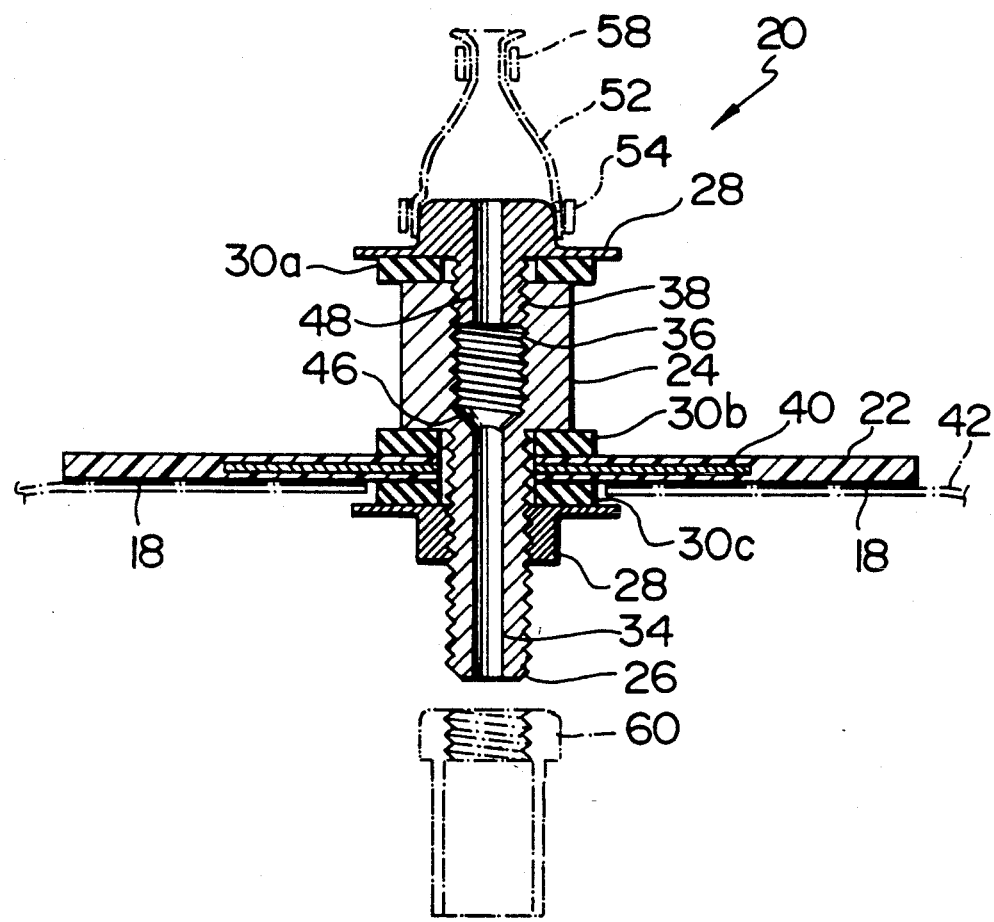
FIG. 6 is a partial cross-sectional view of an alternative embodiment of the present invention taken along line 6—6 in FIG. 5.

FIGS. 5 and 6 illustrate a second embodiment of suspension device 20 intended to enable electrical wiring to pass through the device. Water tight cap 28 has conduit 48 extending between cavity 36 (when cap 28 is mounted on collar 24) and the top outer surface of cap 28. Conduit 48 allows for electrical wires or the like, to be passed through suspension device 20 so that lights or scoreboards may be operatively suspended. Thus, unsightly and potentially hazardous electrical wires 50 are safely routed to the outer surface of the fabric structure.

The water-tight seal provided by cap 28 in the first embodiment.(the embodiment which does not incorporate conduit 48) is maintained in the second embodiment (the embodiment where cap 28 does incorporate conduit 48) by use of a flexible water-tight boot 52 mounted over cap 28. Boot 52 is affixed to cap 28 by clamp 54 and bolt 56. A water-tight seal is made with electrical wiring 50 using clamp 58.

In the second embodiment, the nets, curtains, lights, scoreboards or the like may be suspended by threading supporting structure F onto threaded shaft 26. Supporting structure 60 may be PVC piping (shown with a standard threaded cap) or any other suitable material which may be threaded onto shaft 26. The only requirement for structure 60 is that, for applications requiring electrical power, electrical wire 50 must be free to pass from supporting structure 60 into bore 34.

In operation, suspension device 20 may be installed in two ways. In the first method, device 20 is installed by first cutting a hole in fabric structure 42. The hole is slightly larger in diameter than the diameter of threaded shaft 26. For inflated structure applications, the hole may be cut in fabric structure 42 while the fabric structure is being inflated, or once the fabric structure is already inflated. Disc 22 is placed over the hole so that the hole in disc 22 is approximately centered over the hole in fabric structure 42. Disc 22 is then heat welded onto fabric structure 42 by heat welding the flexible outer flange on disc 22 to the fabric of fabric structure 42. Threaded shaft 26 is then fitted with gasket 30b and inserted through the corresponding holes in disc 22 and fabric structure 42. Gasket 30c is journalled onto shaft 26 from the underside of fabric structure 42. Washer 32 is then threaded onto shaft 26 and tightened to compress gaskets 30b and 30c on either side of fabric structure 42. Rope 44 may then be inserted through bore 34 and knotted so as to seat against bearing surface 46. Watertight cap 28 is then fitted with gasket 30a and screwed into cavity 36. It is tightened to seal cavity 36. In the second embodiment, instead of rope 44 being inserted through bore 34, electrical wire 50 is inserted through bore 34 and conduit 48. Supporting structure 60 is then threaded onto shaft 26. Boot 52 is mounted over electrical wire 50 and cap 28, and sealed by tightening clamps 54 and 58.

The second method of installing device 20 is to pre-assemble the device so that collar 24 and threaded washer 32 compress gaskets 30b and 30c tightly onto disc 22 prior to device 20 being installed on fabric structure 42. To install device 20 when it has been pre-assembled, the hole cut into fabric structure 42 must be slightly larger in diameter then the diameter of washer 32 (assuming device 20 is going to be installed from the exterior of fabric structure 42). Disc 22 is placed over the hole so that shaft 26 and threaded washer 32 extend into fabric structure 42. Disc 22 is then heat welded onto fabric structure 42 by heat welding the flexible outer flange on disc 42 to the fabric of fabric structure 42. Rope 44 or electrical wire 50 is then inserted in the usual manner and device 20 made watertight as described with respect to the first method.

In one embodiment, cap 28 and washer 32 are manufactured by welding washers to a bolt and nut respectively. Rigid disc 40 may be made of aluminium. Gaskets 30 may be made of a neoprene-like foam rubber. Collar 24 and shaft 26 may be machined from solid metal or nylon plastic stock.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for securing an object to a fabric structure, comprising:
   (a) a member having an inner rigid flange portion and an outer flexible flange portion, contiguous to said inner rigid flange portion, for sealing engagement with a first side of said fabric structure; and (b) means for supporting an object, said means being mountable to said inner rigid flange portion and extending through said fabric structure, and said means being adapted to be sealed; and (c) means for connecting to and securing said object supporting means to a second side of said fabric structure, opposite said first side.

2. The apparatus of claim 1 wherein said means for supporting an object is adapted for suspending the object from the second side of the fabric structure and comprises support means mountable on the first side of said inner rigid flange portion.

3. The apparatus of claim 2 wherein said means for supporting a suspended object includes means mountable between the object supporting means and the first side of said inner rigid flange portion.

4. The apparatus of claim 3 wherein said means for supporting a suspended object comprises securing means adapted to extend through said inner rigid flange portion and secures said support means on the first side of said inner rigid flange portion to the connecting means on the second side of said inner rigid flange portion.

5. The apparatus of claim 1 wherein said member is constructed of a rigid disc corresponding in area to said inner rigid flange portion, said rigid disc having an aperture therethrough, said rigid disc being sandwiched between a plurality of layers of flexible fabric, wherein said layers of flexible fabric extend beyond the periphery of said disc to form said outer flexible flange portion and said layers of fabric are bonded together.

6. The apparatus of 5 wherein said means for supporting an object comprises:

a collar and a collar extension, said collar having a recess therein, said collar extension therein a longitudinal bore extending from said recess, said collar extension being adapted to be inserted through the aperture is said inner rigid flange portion; and said connecting member is a washer means adapted to be releasably secured between said extension and the second side of the fabric structure so as to compress said member between said collar and said washer means.

7. The apparatus of claim 6 wherein said means for supporting a suspended object is sealed by a cap releasably mountable on said collar.

8. The apparatus of claim 6, wherein a resilient gasket is mountable between said collar and said washer means.

9. The apparatus of claim 8 wherein a plurality of resilient gaskets are mountable between said collar and said washer means, at least one of said gaskets being mountable on either side of said member when said means for supporting a suspended object is mounted on said member.

10. The apparatus of claim 8, wherein said recess is adapted to receive said cap and said cap is adapted to make a water-tight seal with said collar.

11. The apparatus of claim 6, wherein said outer flexible flange portion is fabric.

12. The apparatus of claim 6 wherein said collar and said washer means have adapted to impinge upon said inner rigid flange portion.

13. The apparatus of claim 12, wherein said recess has a larger diameter than said bore.

14. The apparatus of claim 13 further comprising a suspension means which penetrates through said bore and into said recess for supporting engagement within said recess.

15. The apparatus of claim 14 further comprising means for electrically operative engagement of a suspended object penetrating through said bore, through said recess, and through a water-tight port in said means for supporting a suspended object.

16. The apparatus of claim 10 wherein said cap has therein a conduit which enables penetration through said cap of means for electrically operative engagement of a suspended object, said cap being adapted to make a water-tight seal with said collar and said means for electrically operative engagement of a suspended object.

17. The apparatus of claim 6 wherein said collar extension has thereon threads which are adapted to releasably engage a supporting structure.

18. The apparatus to claim 17 wherein the threads of said collar extension threadably engage the washer means, and secure gaskets on the first and second sides of the outer flexible flange.

19. The apparatus of claim 17 wherein said supporting structure has an opening therein which is adapted, when releasably engaged to said collar extension, to pass means for electrically operative engagement of a suspended object from said supporting structure into said bore.

20. The apparatus of claim 19 wherein said means for electrically operative engagement of a suspended object penetrates through said bore, through said recess and through a water-tight port in said means for supporting a suspended object.

* * * * *